Sept. 6, 1932.  W. M. KELLY  1,876,243
APPARATUS FOR RECLAIMING WASTE MIXTURES
Filed March 11, 1931
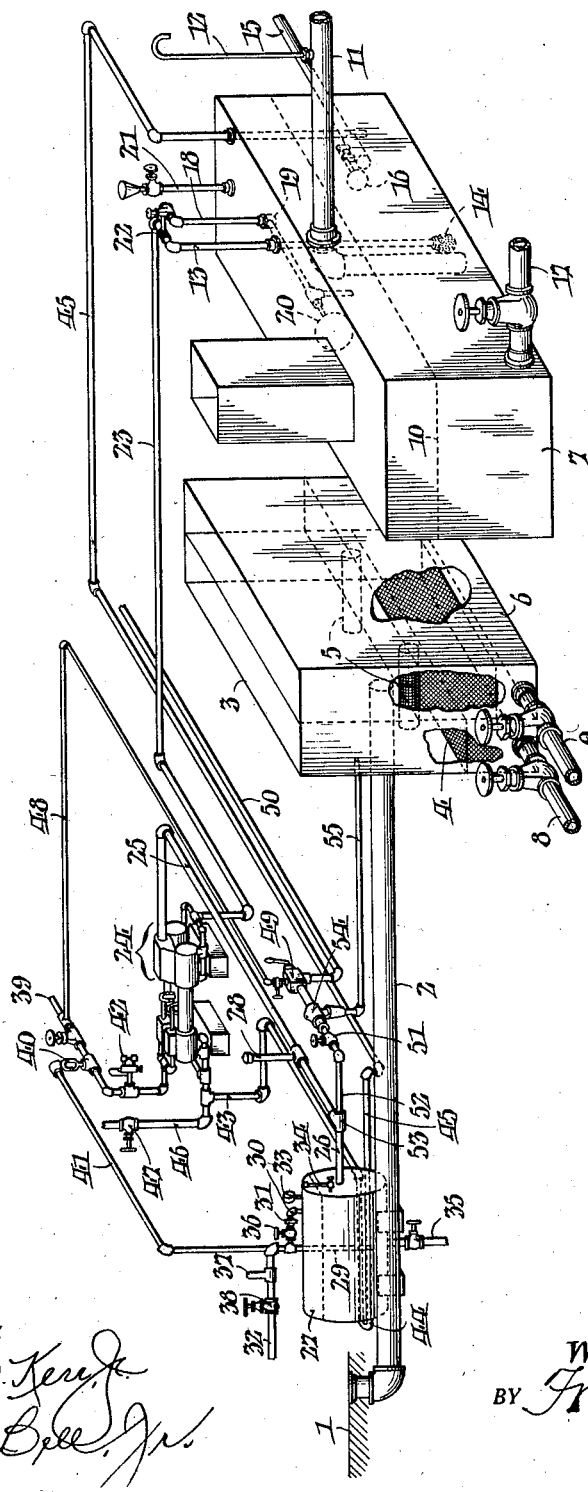
WITNESSES
INVENTOR:
William M. Kelly,
BY
ATTORNEYS.

Patented Sept. 6, 1932

1,876,243

UNITED STATES PATENT OFFICE

WILLIAM M. KELLY, OF PHILADELPHIA, PENNSYLVANIA

APPARATUS FOR RECLAIMING WASTE MIXTURES

Application filed March 11, 1931. Serial No. 521,638.

My invention relates to apparatus for reclaiming waste mixtures and more particularly to the reclaiming of oil and water used, for example, for washing locomotives. A locomotive is customarily washed by spraying it from high pressure nozzles while it stands on a platform above a washing pit. By adding oil to the water used for washing, the locomotive can not only be thoroughly cleaned but there will remain on the body and running gear of the locomotive after cleaning a coating or film of oil which will act as a preservative and give a shiny clean appearance to the locomotive. However, a large portion of the oil and water thus used for washing passes to the bottom of the washing pit and, unless reclaimed, is wasted.

To reduce the expense of washing locomotives with oil and water, this invention provides means for collecting the waste mixture from the bottom of the locomotive pit, filtering it; separating the oil from the water, replenishing with fresh oil and water, and returning the reclaimed liquids for use again in washing.

A more specific object of the invention is to provide automatically controlled means for replenishing the system with a sufficient quantity of fresh water to compensate for the periodic draining off from a separating tank of dirty water and sediment, and additional means for maintaining substantially the same proportion as between the oil and water delivered from the system.

Still other objects and advantages characterizing my invention will become more fully apparent from the description of an example or embodiment thereof which follows hereinafter, having reference to the accompanying drawing, wherein there is diagrammatically illustrated a system for collecting a mixture of oil and water used in washing locomotives or the like and reconditioning said mixture for further use.

In the drawing, the bottom of the pit of the washing station is represented at 1. From this point a drain pipe 2 carries the used mixture of oil and water, together with foreign matter such as grease, dirt, lubricating oil and the like, washed off the locomotive, to a settling tank 3. In the settling tank the mixture passes through strainers which may comprise screens 4 at the sides and bottom of the tank and additional removable screens 5 of cylindrical form at the discharge level of the tank. From the first settling tank 3 the used mixture flows to a second and similar tank 6 and from thence it flows to a separating tank 7. The settling tanks 3 and 6 are provided with drains 8 and 9 for removing from time to time the grease and dirt collecting therein.

The separating tank 7 is preferably of a size considerably larger than the settling tanks 3 and 6, so that the constituents of the mixture may have an opportunity to separate with the water filling the tank to the level indicated at 10, and the oil occupying the remaining space above the water. An overflow pipe 11 leads upward from the bottom of the separating tank and then outward on a level with the top of the tank to a sewer. When an excess of the used mixture flows into the separating tank, a condition which will occur, for example, when the spraying of the washing mixture has been discontinued and the liquid has had time to flow down to the bottom of the washing pit and from thence to the separating tank 7, the tank will overflow through pipe 11, the overflow carrying with it dirty water from the bottom of the tank. A vent 12 in pipe 11 prevents the overflow from siphoning the tank dry.

In the water space of the separating tank 7, there is a suction pipe 13 terminating in a foot valve and screen indicated at 14. There is also in this space a pipe 15 connected with the water supply. The latter pipe 15 is provided with a float valve 16 controlling the admission of fresh water to the tank. When there is a deficiency in the amount of liquid in the tank 7, the falling of the liquid level causes the float valve 16 to open, thereupon a fresh supply of water enters the tank, returning the liquid level to its original height, and thus maintaining a substantially constant level. At the bottom of the separating tank 7 a drain 17 is provided for cleaning purposes.

In the oil space of the separating tank 7, there is a suction pipe 18 flexibly mounted by means of a ball joint 19 and maintained in the oil by a float 20. In the oil space there is also a filling pipe 21 through which fresh oil is admitted to the tank from time to time. The amount of oil in the system will diminish slowly, the loss being represented by the oil remaining on the washed locomotives. It is important to note that only water in excess overflows from the separating tank. The oil in the system need only occasionally be replenished.

The oil and water suction pipes 18 and 13 join at 22 in a common suction line 23 leading to a pump 24. The discharge from this pump 24 passes through pipe lines 25 and 26 to a pressure tank 27. In the discharge pipe 25, I preferably provide an air cushioning chamber at 28. In the pressure tank 27 the oil and water will again tend to separate. Accordingly, the discharge from the pressure tank 27 is delivered through separate pipes 29 and 30, one at the bottom and one at the top of the pressure tank 27. In the oil pipe 30 there is provided at 31 an orificed washer designed to regulate the flow of oil therethrough and thus determine the proportion of oil to water delivered from the pressure tank to the spraying nozzle through pipe 32. The proportion of oil to water carried through pump 24 is substantially determined by the relative capacities of suction pipes 13 and 18. However, on account of the tendency of the oil and water to separate in the pressure tank 27, the discharge from the pressure tank is taken from high and low points in the tank and the orificed washer is provided at 31 so that the mixture discharged from the pressure tank 27 to the spraying nozzle or nozzles is maintained substantially constant as regards the proportion of oil to water.

On the pressure tank 27 there are also shown a pressure gauge 33, and an oil and water level indicator 34. At the bottom of the pressure tank 27 there is a drain 35. A valve 36 in the oil pipe 30 enables the supply of oil to be shut off, and a relief valve 37 prevents the pressure in the tank 27 from exceeding the desired limit. Another valve 38 controls the supply of the mixed oil and water to the spraying nozzle.

The pump shown at 24 is steam operated, the steam supply line being indicated at 39. Steam passes to the pump through a governor 40, responsive to the pressure in tank 27 to which it is connected by a pipe 41, and a lubricator 42. Exhaust steam passes from the pump 24 through pipe 43 to a heating coil 44 in the pressure tank 27. This heating coil 44 assists in the emulsification of the mixture preparatory to its being used for washing. From the heating coil 44 the exhaust steam passes through pipe 45 to the separating tank 7 where it condenses and adds to the water in the system. Thus the exhaust steam is conserved and utilized for useful work rather than wasted. In the exhaust steam line 43 there is a branch line 46 with a release valve 47 adapted to release the exhaust steam in case the temperature in the separating tank 7 reaches a point where the pump will not lift.

For cleaning the pressure tank 27, I also may provide a pipe connection 48 from the high pressure steam line 39. Pipe connection 48 leads to an injector 49 to which there is also connected a pipe 50 from the water supply line. The discharge from the injector leads through a valve 51 and pipe 52 to a T-connection at 53, where pipe 52 joins pipe 26. Between the injector 49 and pressure tank 27 there is a connection at 54 to which is attached an overflow pipe 55.

The operation of the apparatus will be apparent from the above description, and it will be particularly noted that, although the washing nozzle or nozzles may be turned on and off intermittently with the result that there will be periods when there is an excess of the used liquids flowing into the separating tank 7 and other periods when the level of the liquids in the tank will tend to fall below the desired point, the apparatus is so arranged and controlled that the excess or shortage of water is automatically corrected and the relative proportions of the constituents of the mixture in the system remain substantially constant.

While I have described in some detail one particular embodiment or example of the invention, it will be apparent that various changes may be made in the form and arrangement of the apparatus herein described without departing from the spirit of my invention, and that certain features of the invention may be used to advantage without a corresponding use of other features.

Having thus described my invention, I claim:

1. Apparatus for reclaiming a used mixture of oil and water and preparing it for further use comprising means for straining the used mixture, a separating tank wherein the oil and water of said mixture are separated after straining, means controlled by the liquid level in said separating tank for admitting a replenishing supply of fresh water to said tank, a pressure tank, a pump for carying oil and water from said separating tank to said pressure tank, and means for discharging the oil and water from said pressure tank mixed in predetermined proportions.

2. Apparatus for reclaiming a used mixture of oil and water and preparing it for further use comprising means for straining the used mixture, a separating tank wherein the oil and water of said mixture are separated after straining, an overflow pipe leading to the bottom of said separating tank for carrying off dirty water therefrom, means controlled by the liquid level in said separating tank for admitting a replenishing supply of fresh water to said tank, a pressure tank, a pump for carrying oil and water from said separating tank to said pressure tank, and means for discharging the oil and water from said pressure tank mixed in predetermined proportions.

3. An apparatus for reclaiming a used mixture of oil and water comprising means for straining the used mixture, a separating tank having means controlled by the liquid level in said tank for replenishing the used water with fresh water, an overflow pipe leading to the bottom of said tank for carrying off water and foreign matter therefrom when an excess of the mixture flows into said tank, means for preventing siphoning in said overflow pipe, and a pump for drawing oil and water from said tank, said pump having one suction line maintained in the oil of said separating tank and another suction line leading to the lower part of said tank.

4. An apparatus for collecting a mixture of oil and water used in washing locomotives or the like and reconditioning said mixture for further use comprising a washing station, a drain leading therefrom, means for straining the drained mixture, a tank for separating the oil from the water, a pump having a suction line leading to the water in said tank and another suction line maintained in the oil in said tank, and means adapted to receive oil and water from said pump and to deliver the same mixed in predetermined proportions for further use at said washing station.

5. An apparatus for collecting a mixture of oil and water used in washing locomotives or the like and reconditioning said mixture for further use comprising a washing station, a drain leading therefrom, means for straining the drained mixture, a tank for separating the oil from the water, a pump having a suction line leading to the water in said tank and another suction line maintained in the oil in said tank, means adapted to receive the oil and water from said pump and to deliver the same mixed in predetermined proportions for further use at said washing station, means for draining dirty water and foreign matter from said separating tank when an excess of the mixture flows therein, and means controlled by the liquid level in said tank for admitting fresh water to maintain a substantially constant level therein.

In testimony whereof, I have hereunto signed my name at Philadelphia, Pennsylvania, this 26 day of February, 1931.

WILLIAM M. KELLY.